United States Patent [19]

Gerteis

[11] Patent Number: 5,665,925
[45] Date of Patent: Sep. 9, 1997

[54] DEVICE FOR PERFORMING A WEIGHT MEASUREMENT IN CENTRIFUGES

[75] Inventor: Hans Gerteis, Bietigheim-Bissingen, Germany

[73] Assignee: Heinkel Industriezentrifugen GmbH & Co., Bietigheim-Bissingen, Germany

[21] Appl. No.: 234,042

[22] Filed: Apr. 28, 1994

[30] Foreign Application Priority Data

May 13, 1993 [DE] Germany .................. 43 16 081.6

[51] Int. Cl.$^6$ ................ G01G 9/00; G01G 23/01
[52] U.S. Cl. ................ 73/865; 73/1.13; 494/10
[58] Field of Search ................ 73/1 B, 865.9, 73/865, 1 DC; 494/10, 36; 177/50, 132

[56] References Cited

U.S. PATENT DOCUMENTS

| | | | |
|---|---|---|---|
| 1,495,933 | 5/1924 | Swoncera | 494/10 |
| 4,269,711 | 5/1981 | Gerteis | 494/36 X |
| 4,660,663 | 4/1987 | Amacher et al. | 73/1 B X |
| 4,708,011 | 11/1987 | Rautakoipi et al. | 73/1 B X |
| 4,808,308 | 2/1989 | Flory | 494/36 X |
| 5,092,995 | 3/1992 | Gerteis | 494/38 X |
| 5,421,997 | 6/1995 | Gerteis | 494/36 X |
| 5,472,602 | 12/1995 | Feller et al. | 494/36 X |

Primary Examiner—Thomas P. Noland
Attorney, Agent, or Firm—Shenier & O'Connor

[57] ABSTRACT

A device for performing a weight measurement in centrifuges which serve to process chemical substances of different weights and in which fluctuating gas pressures cause different interfering forces which have an interfering effect on the weight measurement. The centrifuge is mounted so as to swivel in a vertical plane, a force measuring element senses the weight-dependent swivel movements of the machine, and a compensation means equalizes the interfering forces caused by the fluctuating gas pressures such that the weight measurement remains unaffected hereby. The compensation means comprises a sensor sensing the gas pressure in the centrifuge, this sensor correspondingly correcting a weight display as a function of changes sensed in the gas pressure.

4 Claims, 1 Drawing Sheet

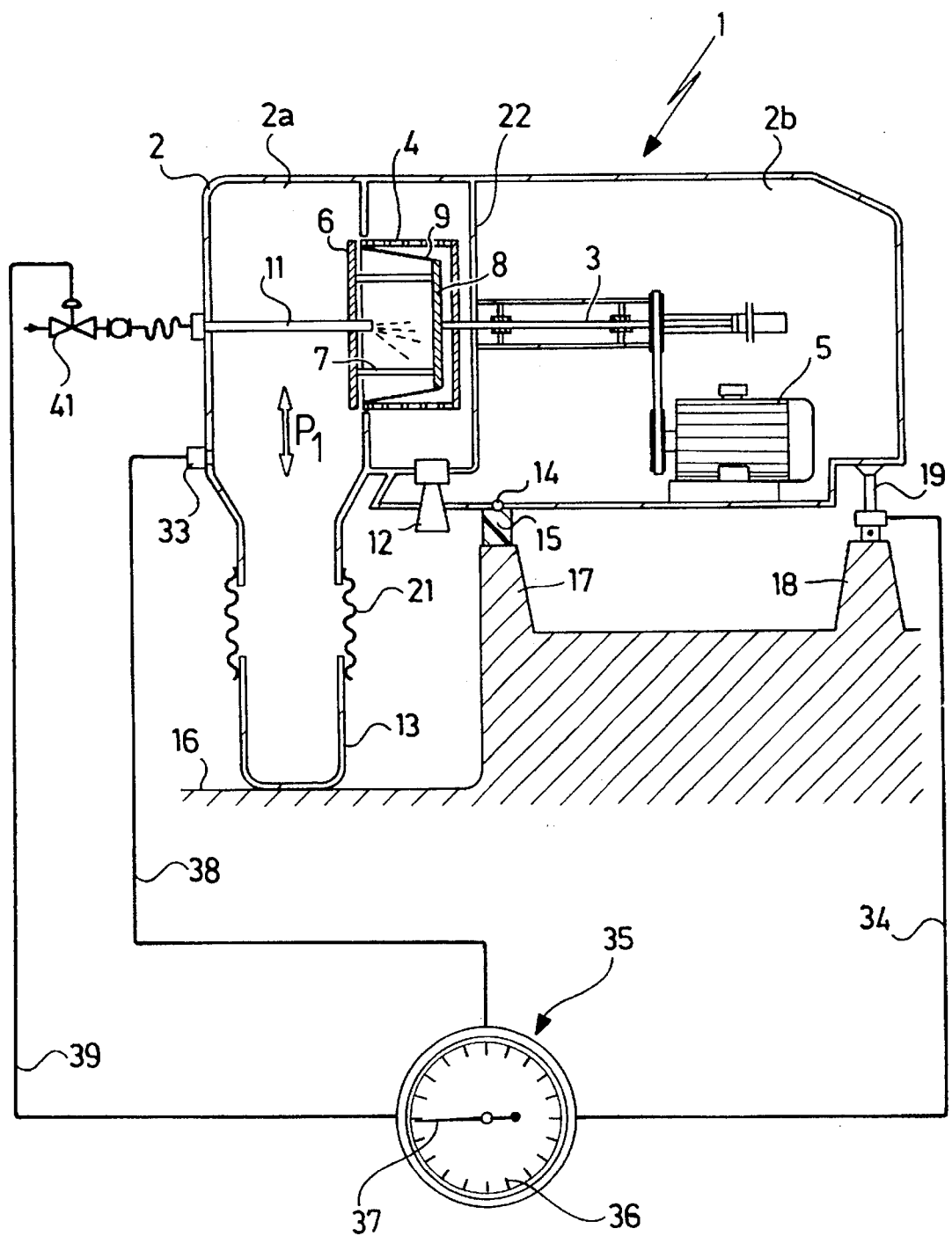

DEVICE FOR PERFORMING A WEIGHT MEASUREMENT IN CENTRIFUGES

BACKGROUND OF THE INVENTION

1. Field of the Invention

The invention relates to a device for performing a weight measurement in centrifuges.

2. The Prior Art

A centrifuge of this type, however without swivellable mounting, is known from U.S. Pat. No. 5,092,995 in the form of an invertible filter centrifuge. Swivellable mountings of apparatuses for the purpose of a weight measurement with force measurement elements are known from the Siemens pamphlet: "Preiswerte Behälterinhaltsmessungen mit Kleinlastzellen und Auswägeeinrichtungen" (=Economical measurements of container contents with low-load cells and weighing means). Such arrangements for weight measurement were also already used in centrifuges of the type mentioned at the beginning. From DE-32 28 714 A1 it is ultimately known to equalize interfering forces caused by gas pressures in a weighing container by a compensation means such that the weight measurement remains unaffected. This known compensation means is, however, relatively complicated and requires, in particular, separate counter-pressure containers, which are connected with the weighing container by means of lines, as well as the diversion of a force from this counter-pressure container which equalizes the interfering forces. These additional apparatuses are relatively complicated and expensive.

SUMMARY OF THE INVENTION

The object of the invention is to compensate the interfering forces occurring during a weight measurement in a generic device in a more simple manner and with relatively low effort with respect to the apparatus.

The object is accomplished by a sensor which senses gas pressure within the apparatus. The measured weight is corrected by compensating for an interfering force based on the sensed gas pressure.

BRIEF DESCRIPTION OF THE DRAWINGS

The following description of a preferred embodiment of the invention, serves to explain the invention in further detail in conjunction with the accompanying drawing which shows an invertible filter centrifuge with compensation means for interfering forces.

DESCRIPTION OF THE PREFERRED EMBODIMENT

The invention is described in the following on the basis of an invertible filter centrifuge even though it is fundamentally usable in other machines, for example, mixing, jolting, sifting machines and the like. The invertible filter centrifuge represented in the drawing as machine 1 for processing chemical substances of different weights comprises, in a manner known per se (cf. U.S. Pat. No. 5,092,995), a drum 4 mounted in a machine housing 2 so as to rotate about an axis 3 and which can be driven by a motor 5 and can be closed or sealed by an axially displaceable lid 6. An intermediate bottom 8 is rigidly connected with the lid 6 via struts 7 and is, therefore, displaced together the the lid 6. A cylindrical filter cloth 9 is arranged between the outer edge of the intermediate bottom 8 and the front edge of the drum 4 adjacent to the lid 6. The housing 2 consists of a front portion 2a and a back portion 2b.

In the illustrated operating position of the machine 1, a substance to be filtered, namely a suspension consisting of solid and liquid components, is filled into the drum 4 via a filler pipe 11. Due to the rotation of the drum and the filter cloth 9, the solid particles collect on the inside of the filter cloth in the form of a so-called "cake", while the liquid reaches the outside of the drum after penetrating the filter cloth 9 and after passing through the perforated drum wall and is collected by a filtrate discharge 12. In order to detach the "cake" from the filter cloth 9 after filtration has been completed, the lid 6 together with the intermediate floor 8 is displaced to the left in the Figure so that the filter cloth turns inside out, and the cake reaches the outside from its inside. By the further rotation of the drum 4 and the inverted filter cloth 9, the cake is catapulted from the filter cloth 9 into the front portion 2a of the housing 2 and falls into a detachably arranged container 13. After the cake has been thrown off, the lid 6 is closed again so that the operating position at the beginning is attained again and suspension to be filtered can be introduced anew into the drum 4 via the filler pipe 11.

The described arrangement including housing 2, drum 4 and motor 5 is rigid in itself and mounted so as to swivel about a horizontal swivel axis 14, i.e. in a vertical plane. The axis 14, for its part, is arranged on a resilient buffer element 15 which, for its part, rests on a stationary support 17 connected with the ground 16. The resilient buffer element 15 can, for example, be a customary rubber-metal element and serves the purpose of absorbing and damping vibrations which could result due to the rotation of the drum 9. The axis 14 can also be omitted when the buffer element 15 itself simultaneously allows a swivelling of the arrangement in a vertical plane. A force measuring element 19 known per se loaded by traction or pressure, for example, a force measuring unit is arranged between the housing 2 and a further stationary support 18. Thus, the entire arrangement functions as a type of beam balance. By means of the substance introduced into the drum 4 via the filler pipe 11, the side of the machine 1 to the left of the horizontal axis 14 above the buffer element 15 is loaded, whereby the force measuring element 19 situated to the right of the axis 14 is affected accordingly. The weight measured in this manner can be displayed by means of a pointer 37 moving about a scale 36 on a weight display 35.

In order not to disrupt the weight measurement, the container 13 receiving the cake and fixedly connected with the ground 16, must be connected with the machine housing 2 via an easily pliable, gas-tight coupling means 21, for example, in the form of a bellows, so that the left side of the arrangement can swivel as freely as possible about the horizontal axis 14.

The processing of the introduced chemical substance, i.e. its filtration, is conducted under a certain pressure (overpressure or underpressure). In order to produce an overpressure, an inert gas, for example, if necessary even air can be introduced into the front portion 2a of the housing 2 which is separated so as to be gas-tight from the back portion 2b of the housing 2 by a dividing wall 22. Due to the flexible coupling means 21 between the movable housing 2 and the stationary container 13, an interfering or disturbing force $P_1$ results in the front portion 2a of the housing 2 due to the gas pressure prevailing in the machine and this disturbing force is directed to the top at overpressure and to the bottom at underpressure and distorts the weighing process since it counteracts the weight of the substance filled into the drum or apparently increases this weight which is directed downwards. Thus, in order to achieve an exact weight measurement, it is necessary to compensate the interfering force $P_1$. A sensor 33 is provided for this on the machine housing 2 and senses the gas pressure on the inside of the machine (housing portion 2a). The force measuring element 19 of the arrangement is connected with the weight display 35 via an electric line 34. The pressure sensor 33 is also connected with the weight display 35 via a line 38. The weight display 35 comprises an electrical means known per se, by means of which the position of the pointer 37 is correspondingly corrected as a function of the gas pressure prevailing in the machine 1, so that the pointer 37 can display the respective true weight of the chemical substance introduced into the machine or the degree of dehydration of a filter cake. With this arrangement, fluctuating gas pressures in the machine 1 can also be quickly compensated at any time.

A further line 39 connects the weight display 35 in a conventional manner with a valve 41 controlling the filler pipe 11 so that when a certain filling weight is reached, the valve 41 can be closed and thus the influx of further substance into the drum 4 can be prevented.

The present disclosure relates to the subject matter disclosed in German application No. P 43 16 081.6 of May 13, 1993, the entire specification of which is incorporated herein by reference.

Having thus described my invention, what I claim is:

1. In apparatus for determining the weight of a material being processed in a pressure-sealed centrifuge mounted for pivotal movement, the combination including
    means for measuring the force required to prevent appreciable pivotal movement of the centrifuge which would otherwise be caused by the weight of the material,
    means for sensing a gas pressure within the sealed centrifuge, said gas pressure producing torques which would tend to pivot the centrifuge and interfere with the force measurement,
    and means responsive to the force measuring means and to the gas pressure sensing means for determining the weight of the material.

2. Apparatus according to claim 1 wherein the centrifuge is mounted for pivotal movement about a horizontal pivot axis.

3. Apparatus according to claim 2, including means for damping pivotal movement of the centrifuge.

4. Apparatus according to claim 3 wherein said damping means is resilient and includes portions horizontally disposed on either side of the pivot axis.

* * * * *